United States Patent
Wagoner et al.

(10) Patent No.: US 11,258,387 B1
(45) Date of Patent: Feb. 22, 2022

(54) SYSTEM AND METHOD FOR NEUTRAL POINT BALANCING FOR BACK-TO-BACK VOLTAGE SOURCE CONVERTERS

(71) Applicant: General Electric Renovables Espana, S.L., Barcelona (ES)

(72) Inventors: Robert Gregory Wagoner, Roanoke, VA (US); Joseph Kiran Banda, Bangalore (IN); Kapil Jha, Bangalore (IN); Fernando Arturo Ramirez Sanchez, Salem, VA (US); Bacil Shaqqo, Roanoke, VA (US); Hridya Ittamveettil, Bangalore (IN)

(73) Assignee: General Electric Renovables Espana, S.L., Barcelona (ES)

(*) Notice: Subject to any disclaimer, the term of this patent is extended or adjusted under 35 U.S.C. 154(b) by 0 days.

(21) Appl. No.: 17/084,731

(22) Filed: Oct. 30, 2020

(51) Int. Cl.
| | |
|---|---|
| *H02P 9/00* | (2006.01) |
| *H02P 9/10* | (2006.01) |
| *H02P 9/30* | (2006.01) |
| *F03D 9/25* | (2016.01) |
| *H02P 103/10* | (2016.01) |
| *H02P 103/20* | (2016.01) |
| *H02P 101/15* | (2016.01) |

(52) U.S. Cl.
CPC .............. *H02P 9/102* (2013.01); *F03D 9/25* (2016.05); *H02P 9/007* (2013.01); *H02P 9/305* (2013.01); *F05B 2220/706* (2013.01); *H02P 2101/15* (2015.01); *H02P 2103/10* (2015.01); *H02P 2103/20* (2015.01)

(58) Field of Classification Search
CPC .......... H02P 9/102; H02P 9/007; H02P 9/305; H02P 2103/20; H02P 2101/15; H02P 2103/10; F03D 9/25; F05B 2220/706
See application file for complete search history.

(56) References Cited

U.S. PATENT DOCUMENTS

| | | | | |
|---|---|---|---|---|
| 8,441,820 | B2 * | 5/2013 | Shen ..................... | H02M 7/487 363/56.01 |
| 10,224,830 | B2 * | 3/2019 | Basic .................... | H02M 7/487 |
| 2013/0128632 | A1 * | 5/2013 | Yang .................... | H02M 7/487 363/37 |

FOREIGN PATENT DOCUMENTS

KR        101379202 B1     3/2014

\* cited by examiner

*Primary Examiner* — Julio C. Gonzalez
(74) *Attorney, Agent, or Firm* — Dority & Manning, P.A.

(57) ABSTRACT

A method for controlling a three-level back-to-back voltage source power conversion assembly includes receiving an indication of a DC or AC unbalance occurring in voltage of a DC link. The power conversion assembly has a first power converter coupled to a second power converter via the DC link. In response to receiving the indication, the method includes activating a balancing algorithm that includes determining a deviation of a midpoint voltage of the DC link as a function of a total voltage of the DC link, calculating a voltage compensation needed for pulse-width modulation signals of the power conversion assembly based on the deviation, and coordinating common mode voltage injection from each of the power converters independently at a neutral point of the power conversion assembly based on the voltage compensation, thereby minimizing the at least one of the DC unbalance or the AC unbalance at any given operating condition.

18 Claims, 9 Drawing Sheets

SYSTEM AND METHOD FOR NEUTRAL POINT BALANCING FOR BACK-TO-BACK VOLTAGE SOURCE CONVERTERS

FIELD

The present disclosure relates generally to voltage source converters, and more particularly to systems and methods that provide coordinated neutral point voltage balancing for voltage source back-to-back three-level neutral point clamped (NPC) converters.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor.

In many wind turbine configurations, the generator is electrically coupled to a bi-directional voltage source power converter that includes a rotor-side converter (RSC) joined to a line-side converter (LSC) via a regulated DC link. Each of the RSC and the LSC typically includes a bank of pulse width modulated switching devices, for example, insulated gate bipolar transistors (IGBTs). As such, the LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). In general, the LSC is used to control the power factor at the input mains along with DC bus voltage regulation, whereas the RSC is used to control active/reactive power for variable speed operation of the wind turbine.

For certain power converters, such as three-level neutral point clamped (NPC) converters, fluctuating neutral point voltage (i.e. the DC Link voltages of upper and lower capacitors) can be different in some cases, which is termed as DC unbalance. Also, in other cases, the neutral point voltage tends to oscillate with the triplen frequency of the converter's fundamental voltage, which is termed as AC unbalance. If such at least one of the DC unbalance or the AC unbalance is not balanced through any pulse width modulation (PWM) technique or external hardware circuitry, the voltages of the upper and lower capacitors can begin to drift away, thereby resulting in charging of one capacitor to the total DC link voltage and the other capacitor to zero voltage. Even if the DC unbalance problem is solved, there exists the triplen frequency neutral point voltage oscillation (AC unbalance), which is also an inherent problem that needs attention from either controls or by placing a large capacitor. This problem is aggravated for back-to-back three-level NPC converters applied to DFIG systems for wind applications where the frequency of the LSC is fixed to 50/60 Hz and the frequency of the RSC is variable at the slip frequency.

Conventional control schemes for providing voltage balance include common mode voltage injection with carrier-based PWM techniques. However, such solutions are restricted to single converter systems or back-to-back systems with a close match of frequency on both sides of the converters.

Thus, an improved system and method for controlling voltage source converters of renewable energy power systems, such as wind turbines, that address the aforementioned issues would be welcomed in the art. Accordingly, the present disclosure is directed to a system and method that provides coordinated neutral point balancing for back-to-back three-level NPC converters with adaptive controller gains for both the RSC and the LSC based on, for example, slip, modulation index, power factor, and/or active power.

BRIEF DESCRIPTION

Aspects and advantages of the invention will be set forth in part in the following description, or may be obvious from the description, or may be learned through practice of the invention.

In one aspect, the present disclosure is directed to a method for controlling a three-level back-to-back voltage source power conversion assembly. The voltage source power conversion assembly has a first power converter coupled to a second power converter via a direct current (DC) link. The method comprises receiving, via a controller, an indication of at least one of a direct current (DC) unbalance or an alternating current (AC) unbalance occurring in voltage of the DC link. In response to receiving the indication, the method includes activating, via the controller, a balancing algorithm for the voltage source power conversion assembly. The balancing algorithm includes determining a deviation of a midpoint voltage of the DC link as a function of a total voltage of the DC link, calculating a voltage compensation needed for pulse-width modulation signals of the power conversion assembly based on the deviation in the midpoint voltage, and coordinating common mode voltage injection from each of the first and second power converters independently at a neutral point of the voltage source power conversion assembly based on the voltage compensation, thereby minimizing the at least one of the DC unbalance or the AC unbalance at any given operating condition.

In an embodiment, the balancing algorithm may also include determining a frequency of the AC unbalance.

In further embodiments, coordinating common mode voltage injection from each of the first and second power converters independently at the neutral point of the voltage source power conversion assembly based on the voltage compensation may include applying adaptive controller gains to each of the first and second power converters based on one or more operating parameters of the voltage source power conversion assembly.

In one embodiment, for example, the operating parameter(s) may include, for example, frequency of the AC unbalance, a modulation index, a power factor, a slip frequency, or an active power.

For example, in particular embodiments, coordinating common mode voltage injection from each of the first and second power converters independently at the neutral point of the voltage source power conversion assembly based on the voltage compensation may include providing first and second balancing proportional integral (PI) regulators tuned at a first bandwidth and a different, second bandwidth, respectively and independently determining the adaptive controller gains for each of the first and second power converters using the first and second PI regulators, respectively.

In another embodiment, coordinating common mode voltage injection from each of the first and second power converters independently at the neutral point of the voltage source power conversion assembly based on the voltage compensation may include selectively switching between the first power converter and the second power converter for providing the common mode voltage injection at the neutral point based on at least one of a set of rules or one or more look-up tables. For example, in such embodiments, selectively switching between the first power converter and the second power converter for providing the common mode voltage injection at the neutral point may include providing the common mode voltage injection at the neutral point via at least one of the first power converter only, the second power converter only, or both the first and second power converters based on the one or more operating parameters.

In further embodiments, the first and second sets of switching devices may be arranged in a neutral point clamped (NPC) topology. Alternatively, the first and second sets of switching devices may be arranged in an active neutral point clamped (ANPC) topology.

In several embodiments, the voltage source power conversion assembly may be part of a renewable energy power conversion system that includes a doubly-fed induction generator coupled to the voltage source power conversion assembly. Moreover, in an embodiment, the renewable energy power conversion system may be a wind turbine power system, a solar power system, or an energy storage system.

For example, where the renewable energy power conversion system is the wind turbine power system, the first power converter may be a rotor-side converter and the second power converter may be a line-side converter. Moreover, in such embodiments, the DC unbalance and/or the AC unbalance occurring in the voltage of the DC link may occur in at least one of a triplen frequency of an asynchronous generator slip frequency or a synchronous generator fundamental frequency In another aspect, the present disclosure is directed to a three-level back-to-back voltage source power conversion assembly. The power conversion assembly includes a first power converter having a first set of switching devices and a second power converter coupled to the first power converter via a direct current (DC) link. The second power converter includes a second set of switching devices. The power conversion assembly also includes a converter controller communicatively coupled to the first and second power converters. The converter controller is configured to implement a balancing algorithm for the power conversion assembly, including but not limited to, in response to receiving an indication of at least one of a direct current (DC) unbalance or an alternating current (AC) unbalance occurring in upper and/or lower capacitor voltages of the DC link, determining a deviation of a midpoint voltage of the DC link as a function of a total voltage of the DC link, calculating a voltage compensation needed for pulse-width modulation signals of the power conversion assembly based on the deviation in the midpoint voltage, and coordinating common mode voltage injection from each of the first and second power converters independently at a neutral point of the voltage source power conversion assembly based on the voltage compensation, thereby minimizing the at least one of the DC unbalance or the AC unbalance at any given operating condition. It should be further understood that the power conversion assembly may further include any of the additional features described herein.

In yet another aspect, the present disclosure is directed to a wind turbine power system. The wind turbine power system includes a generator having a rotor and stator and a three-level back-to-back voltage source power conversion assembly electrically coupled to the generator. The power conversion assembly includes a rotor-side converter having a first set of switching devices and a line-side converter coupled to the rotor-side converter via a direct current (DC) link. The DC link further includes upper and lower capacitors. The line-side converter includes a second set of switching devices. The wind turbine power system also includes a converter controller communicatively coupled to the rotor-side and line-side converters. The converter controller is configured to implement a balancing algorithm for the power conversion assembly, including but not limited to, in response to receiving an indication of an unbalance (DC or AC) occurring in voltage of at least one of the upper or lower capacitors of the DC link, determining a deviation of a midpoint voltage of the DC link as a function of a total voltage of the DC link, calculating a voltage compensation needed for pulse-width modulation signals of the power conversion assembly based on the deviation in the midpoint voltage, and coordinating common mode voltage injection from each of the first and second power converters independently at a neutral point of the voltage source power conversion assembly based on the voltage compensation, thereby minimizing the at least one of the DC unbalance or the AC unbalance at any given operating condition. It should be further understood that the wind turbine power system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
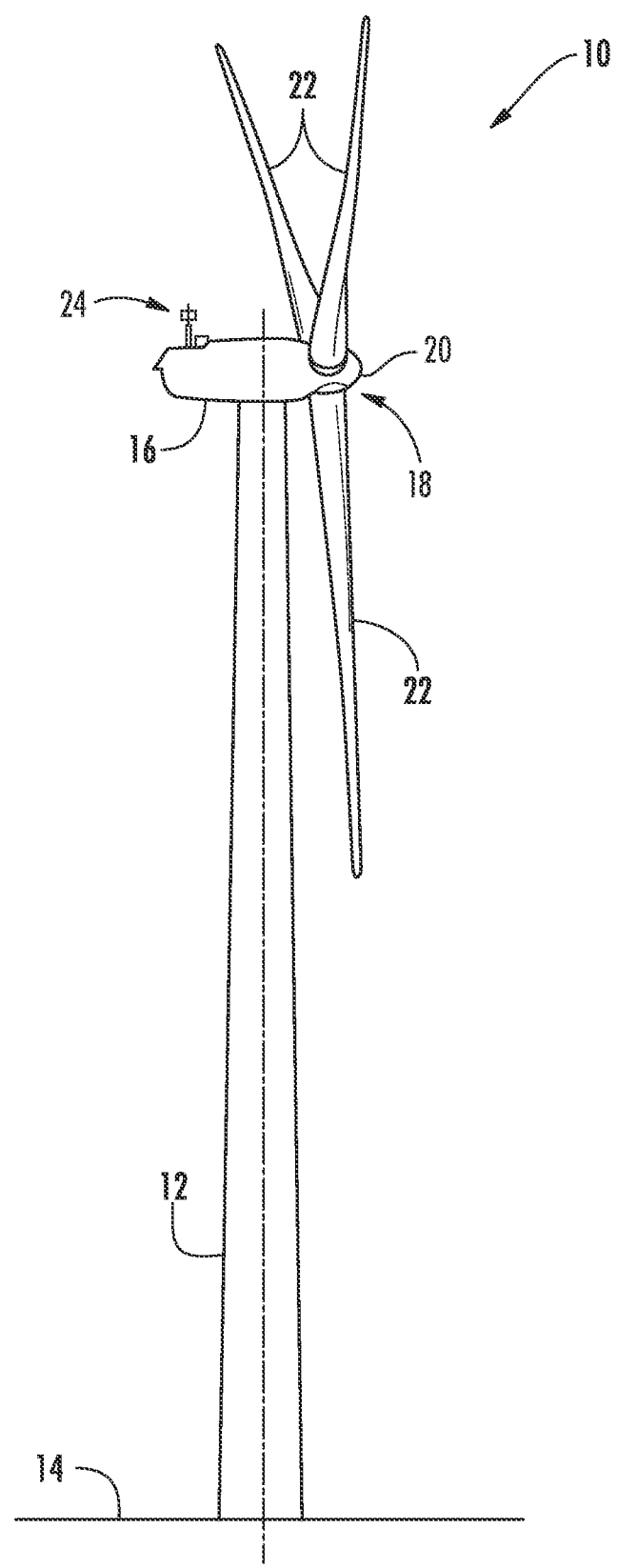
FIG. 1 illustrates a perspective view of an embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a system and method that addresses an inherent drawback of fluctuating neutral point voltage with three-level back-to-back NPC converters, i.e. the DC link voltages of the upper and lower capacitors start becoming unequal along with the oscillationns of triplen frequency of the converter voltage. If not balanced through any PWM technique or external hardware circuitry, the voltages of the upper and lower capacitors start drifting away, which results in charging of one capacitor to the total DC link voltage and the other capacitor to zero voltage. In certain instances, this problem can be aggravated for back-to-back three-level NPC systems applied to DFIG systems for wind application where the frequency of the LSC is typically fixed, e.g. to 50/60 Hz, and the frequency of the RSC is variable at the slip frequency. Thus, the present disclosure proposes a neutral point balancing scheme for three-level back-to-back three-level voltage source power conversion systems. In particular, the control scheme may include adaptive controller gains on both sides of the converter (e.g. both the RSC and the LSC) based on, as an example, slip, modulation index, power factor, and/or active power. In another embodiment, the present disclosure may include a control system based on the DC link midpoint balancing using the PWM modulation signals to regulate the DC midpoint voltage. More specifically, in such embodiments, the midpoint voltage deviation can be regulated to a desired voltage value of Vdc/2, (where Vdc is the total DC link voltage) to maintain the DC capacitor voltages balanced. It should also be understood that the present disclosure can be applied to any renewable energy power conversion system in addition to wind turbine power systems, such as a solar power system, an energy storage system, or combinations thereof.

Accordingly, the present disclosure provides many advantages not present in the prior art. For example, systems and methods of the present disclosure provide improved effectiveness of the balancing algorithm, which operates from both sides of the three-level voltage source power conversion system. Further, systems and methods of the present disclosure provide coordinated common mode voltage injection based on the ripple frequency of the neutral point voltage. Moreover, in certain embodiments, systems and methods of the present disclosure can provide adaptive controller gains on both sides of the converter (e.g. both the RSC and the LSC) such that the balancing algorithm can achieve minimum DC and AC unbalance at any given operating condition. In addition, systems and methods of the present disclosure can utilize rules and/or look-up tables to selectively switch the balancing algorithm from only the LSC, only the RSC, or from both sides.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy. One or more wind conditions, such as wind speed and/or wind direction may also be monitored via a wind sensor 24, such as an anemometer, located on the nacelle 16 or any other suitable location near the wind turbine 10.

Figure 2:
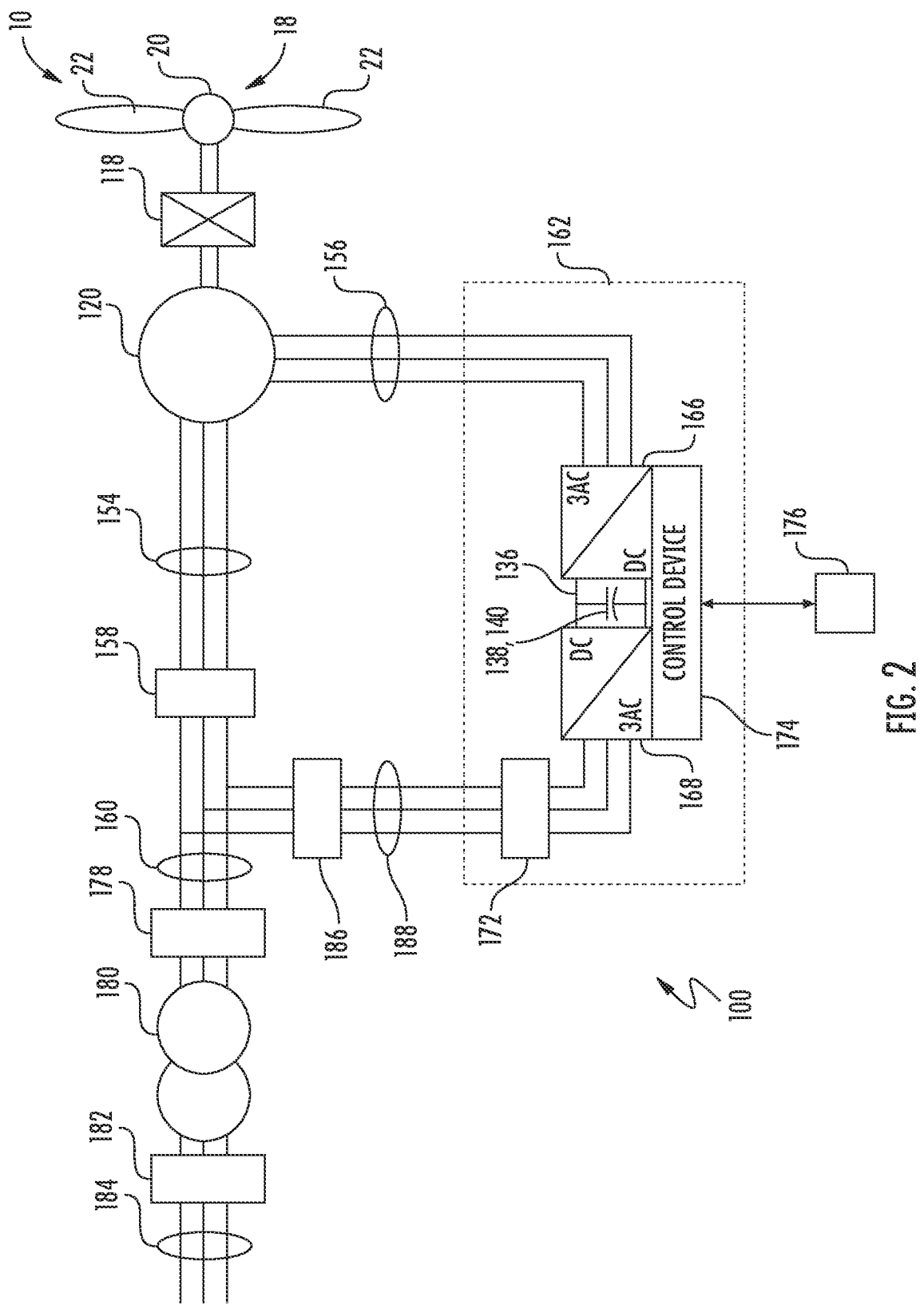
FIG. 2 illustrates a schematic view of one embodiment of a wind turbine electrical power system suitable for use with the wind turbine shown in FIG. 1.

Referring now to FIG. 2, a schematic diagram of one embodiment of a wind turbine power system 100 ("wind turbine system") is illustrated in accordance with aspects of the present disclosure. Although the present disclosure will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 2, the rotor 18 of the wind turbine 10 (FIG. 1) may, optionally, be coupled to a gearbox 118, which is, in turn, coupled to a generator 120, which may be a doubly fed induction generator (DFIG). As shown, the DFIG 120 may be connected to a stator bus 154. Further, as shown, a power converter 162 may be connected to the DFIG 120 via a rotor bus 156, and to the stator bus 154 via a line side bus 188. As such, the stator bus 154 may provide an output multiphase power (e.g. three-phase power) from a stator of the DFIG 120, and the rotor bus 156 may provide an output multiphase power (e.g. three-phase power) from a rotor of the DFIG 120. The power converter 162 may also include a rotor side converter (RSC) 166 and a line side converter (LSC) 168. The DFIG 120 is coupled via the rotor bus 156 to the RSC 166. Additionally, the RSC 166 is coupled to the LSC 168 via a DC link 136 across which is at least one DC link capacitor 138, 140. As shown in FIG.

3, the DC link 136 includes an upper capacitor 138 and a lower capacitor 140. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 may be coupled to a converter controller 174 in order to control the operation of the RSC 166 and/or the LSC 168 as described herein. It should be noted that the converter controller 174 may be configured as an interface between the power converter 162 and a local wind turbine control system 176 and may include any number of control devices. In one embodiment, the controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162. For an individual DFIG wind turbine power system 100, the reactive power may be supplied primarily by the RSC 166, via the generator 120 and the LSC 168.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the LSC 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed states or operating characteristics of the wind turbine power system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. Other feedback from other sensors may also be used by the controller 174 or control system 176 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at the hub 20 and the blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 162, and specifically, the bi-directional characteristics of the LSC 168 and RSC 166, facilitate feeding back at least some of the generated electrical power into generator rotor. More specifically, electrical power may be transmitted from the stator bus 154 to the line side bus 188 and subsequently through the line contactor 172 and into the power converter 162, specifically the LSC 168 which acts as a rectifier and rectifies the sinusoidal, three-phase AC power to DC power. The DC power is transmitted into the DC link 136. The capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power by adjusting voltages, currents, and frequencies. This conversion is monitored and controlled via the converter controller 174. The converted AC power is transmitted from the RSC 166 via the rotor bus 156 to the generator rotor. In this manner, generator reactive power control is facilitated by controlling rotor current and voltage.

Figure 3:
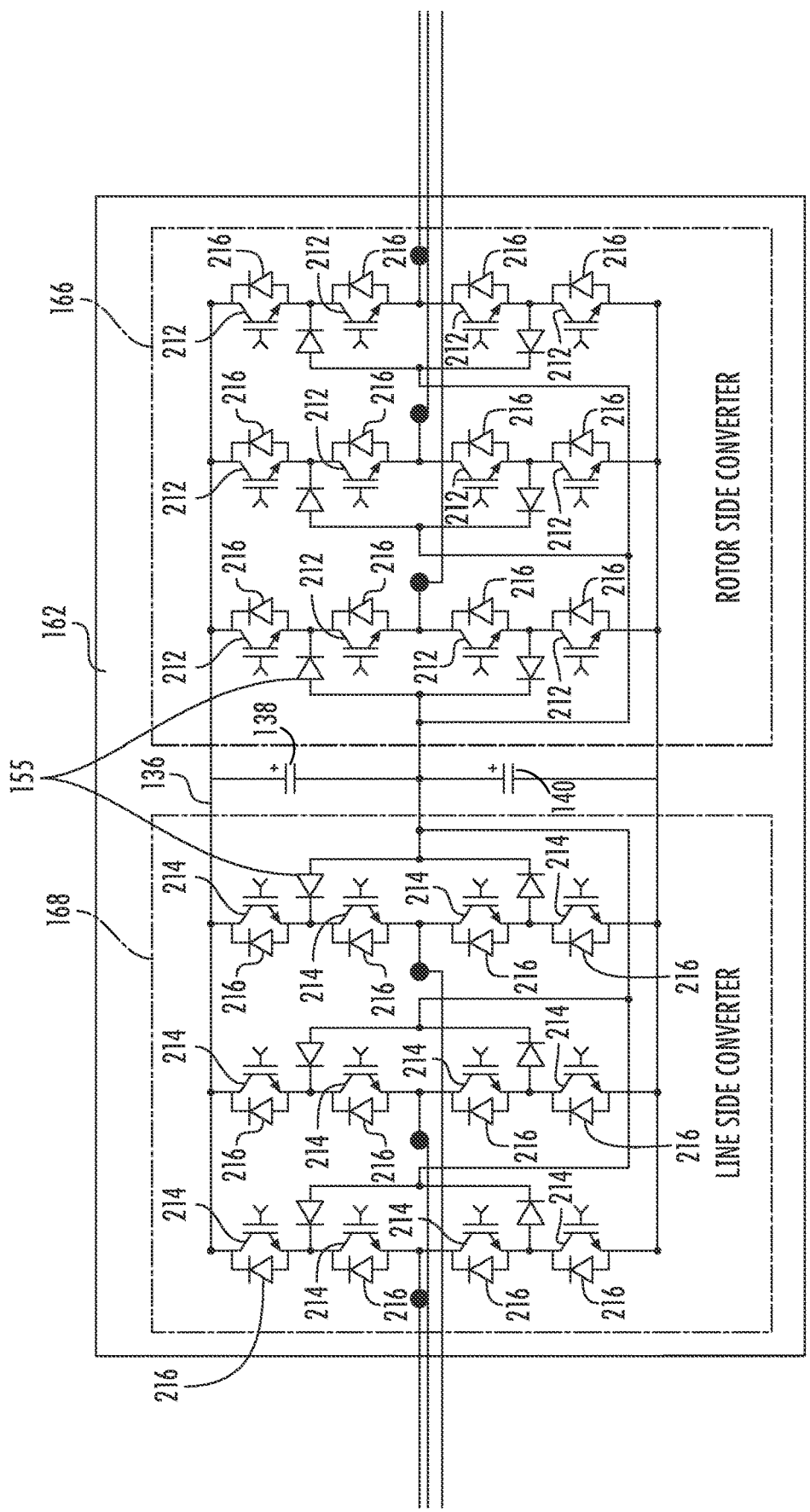
FIG. 3 illustrates a schematic diagram of one embodiment of a three-level voltage-source power converter of a wind turbine according to the present disclosure.
Figure 4:
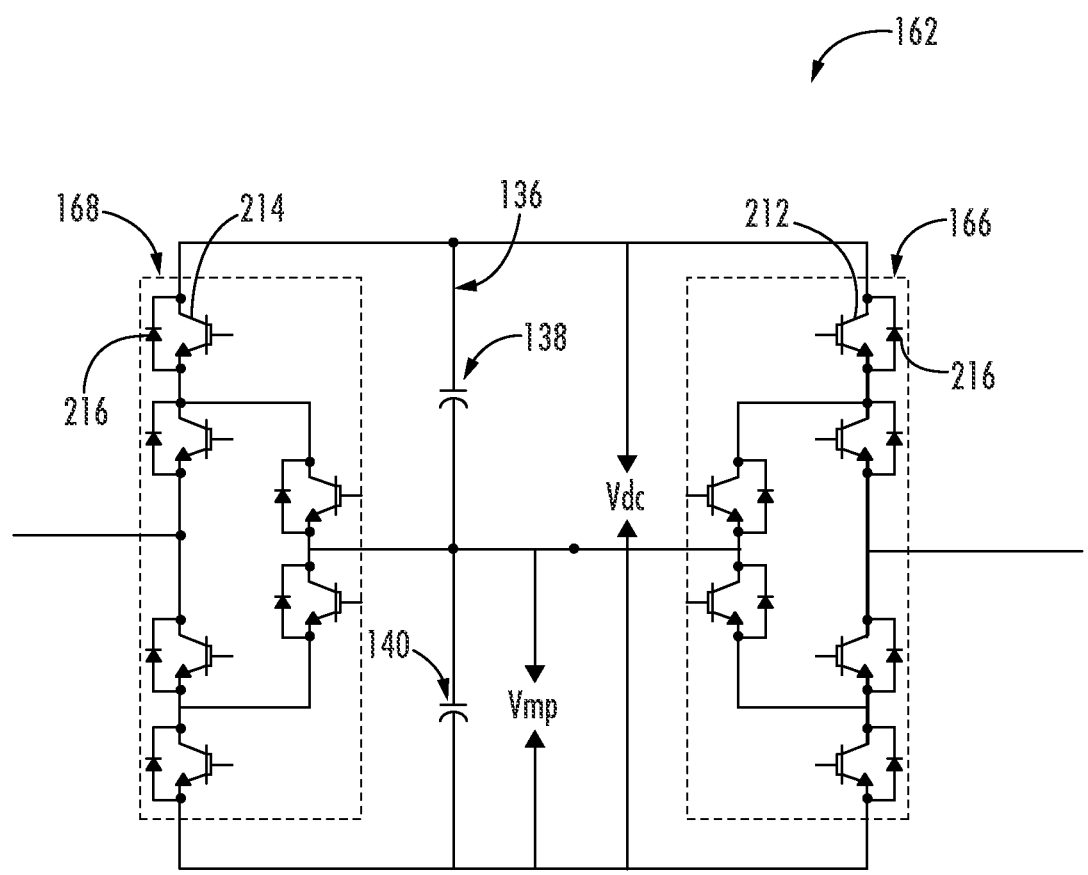
FIG. 4 illustrates a schematic diagram of another embodiment of a three-level voltage-source power converter of a wind turbine according to the present disclosure.

Referring now to FIGS. 3 and 4, schematic diagrams of various embodiments of a three-level back-to-back voltage source power converter 162 (i.e. a converter where output voltage has three possible values) are illustrated in accordance with aspects of the present disclosure. As shown in FIG. 3, the RSC 166 includes a plurality of bridge circuits and at least one clamping diode 155 with each phase of the rotor bus 156 input to the RSC 166 being coupled to a single bridge circuit. In addition, the LSC 168 may also include a plurality of bridge circuits and at least one clamping diode 155. Similar to the RSC 166, the LSC 168 also includes a single bridge circuit for each output phase of the LSC 168. In other embodiments, the LSC 168, the RSC 166, or both the LSC 168 and the RSC 166 may include parallel bridge circuits without deviating from the scope of the present disclosure.

Moreover, as shown in FIGS. 3 and 4, each bridge circuit may generally include a plurality of switching elements (e.g. IGBTs) coupled in series with one another. For instance, as shown in FIG. 3, the plurality of switching devices of each bridge circuit may be arranged in a neutral point clamped (NPC) topology. As described herein, an NPC topology generally refers to a topology containing two series-connected high-side switches and two series-connected low-side switches. Often, IGBTs with anti-parallel diodes are used as the switches for an NPC converter, but other two-quadrant switch configurations can also be employed. In particular, as shown in FIGS. 3 and 4, the RSC 166 may include a plurality of first IGBTs 212 and the LSC 168 may include a plurality of second IGBTs 214. In addition, as shown, a diode 216 may be coupled in parallel with each of the IGBTs 212, 214. As is generally understood, the LSC 168 and the RSC 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control gate timing commands of the IGBTs to provide a desired output. It should be appreciated by those of ordinary skill in the art that, as an alternative to IGBTs, the power convertor 162 may include any other suitable switching elements. Moreover, as used herein and shown particularly in FIG. 4, the total voltage across the DC link 136 may be represented as Vdc, whereas the midpoint voltage of the DC link 136 is represented as Vmp. Furthermore, in such embodiments, the DC midpoint is the location where the DC capacitors 138 and 140 tie to each other.

Figure 5:
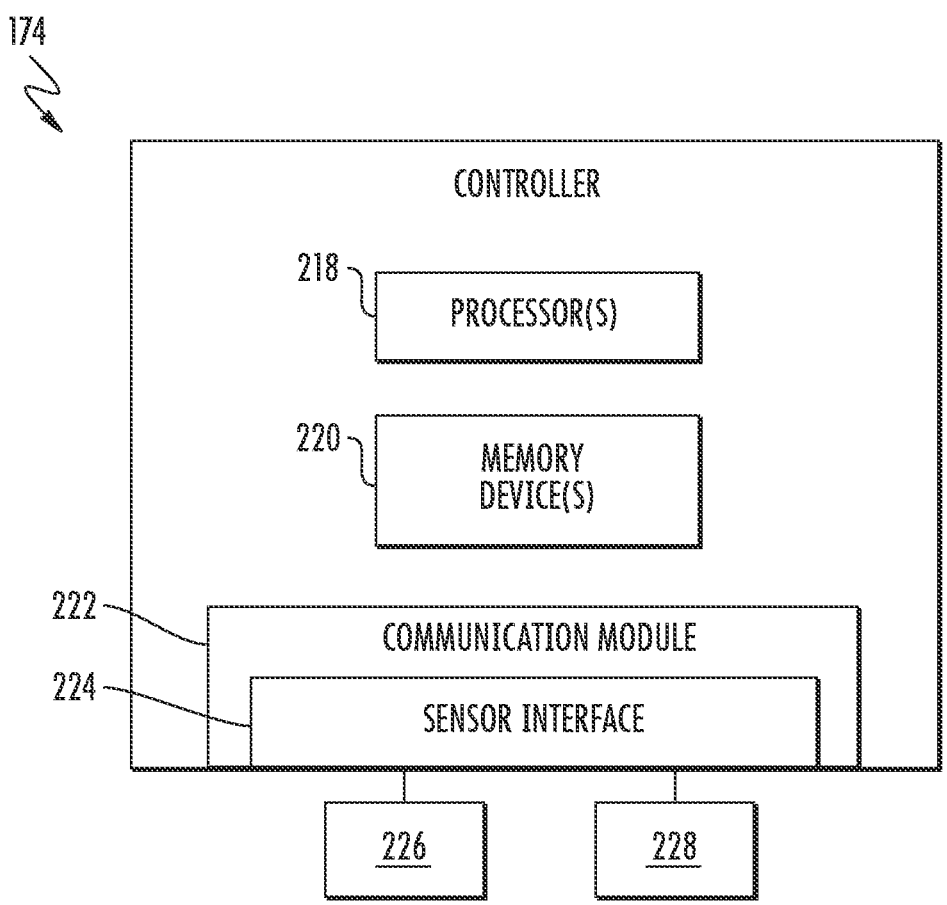
FIG. 5 illustrates a block diagram of one embodiment of a converter controller that can be used to control the voltage source power converter of the wind turbine power system described herein according to the present disclosure.

It should be appreciated that the converter controller 174 may correspond to any suitable computing device and/or any combination of computing devices. For instance, as shown in FIG. 5, the controller 174 may include one or more processor(s) 218 and associated memory device(s) 220 configured to perform a variety of computer-implemented functions (e.g., performing the methods, steps, calculations and the like and storing relevant data as disclosed herein). Additionally, the controller 174 may also include a communications module 222 to facilitate communications between the controller 174 and the various components of the power system 100. Further, the communications module 222 may include a sensor interface 224 (e.g., one or more analog-to-digital converters) to permit signals transmitted from one or more sensors 226, 228 located anywhere through the power system 100 to be converted into signals that can be understood and processed by the processors 218.

It should be appreciated that the sensors 226, 228 may be communicatively coupled to the communications module 222 using any suitable means. For example, as shown in FIG. 5, the sensors 226, 228 may be coupled to the sensor interface 224 via a wired connection. However, in other embodiments, the sensors 226, 228 may be coupled to the sensor interface 224 via a wireless connection, such as by using any suitable wireless communications protocol known in the art. As such, the processor 218 may be configured to receive one or more signals from the sensors 226, 228. Accordingly, such sensors 226, 228 may be located throughout the power system 100.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 218 is also configured to compute advanced control algorithms and communicate to a variety of Ethernet or serial-based protocols (Modbus, OPC, CAN, etc.). Additionally, the memory device(s) 220 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 220 may generally be configured to store suitable computer-readable instructions that, when implemented by the processor(s) 218, configure the controller 174 to perform the various functions as described herein.

Figure 6:
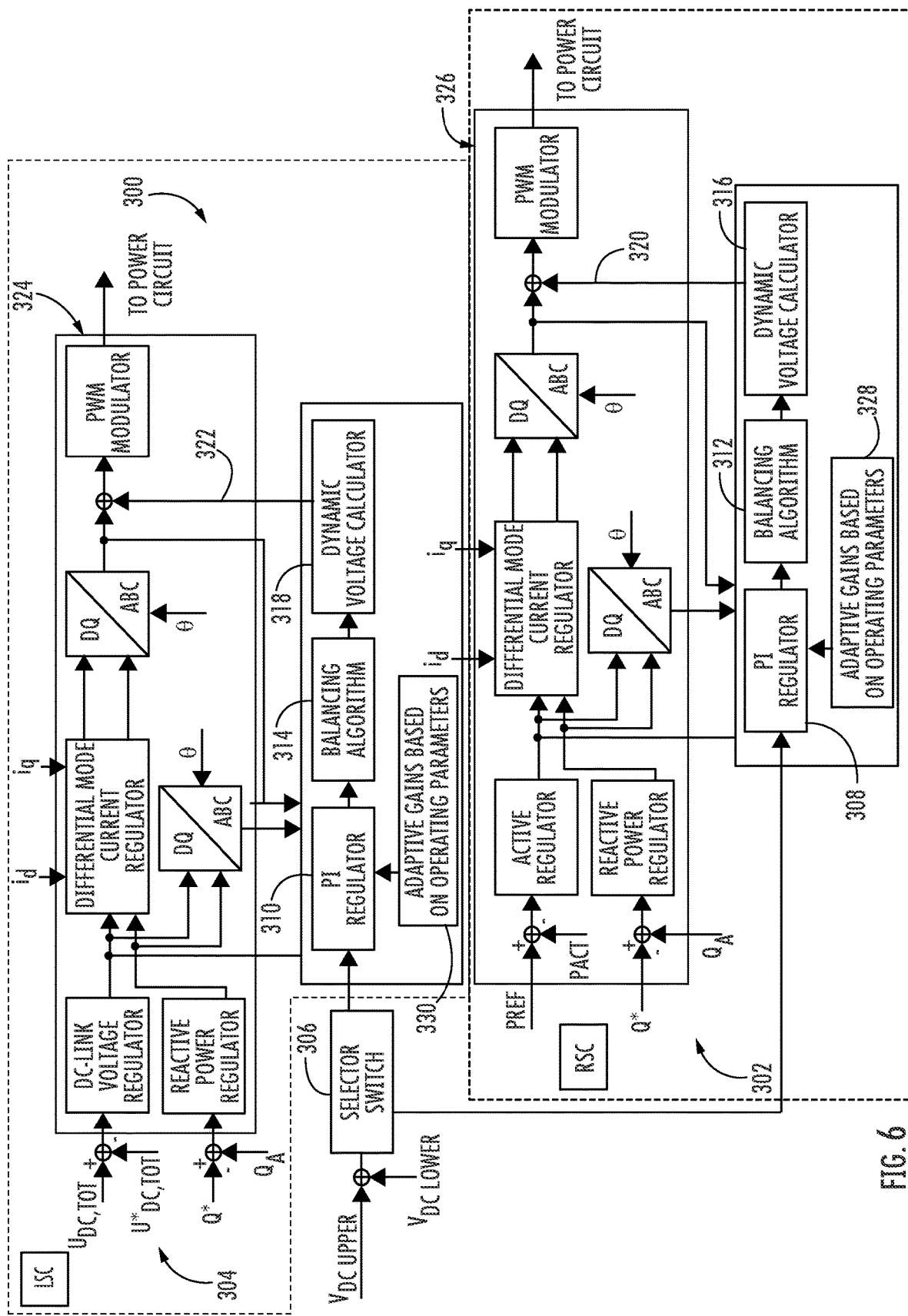
FIG. 6 illustrates a schematic diagram of one embodiment of a system for controlling a voltage source power converter of a renewable energy power conversion system according to the present disclosure.
Figure 7:
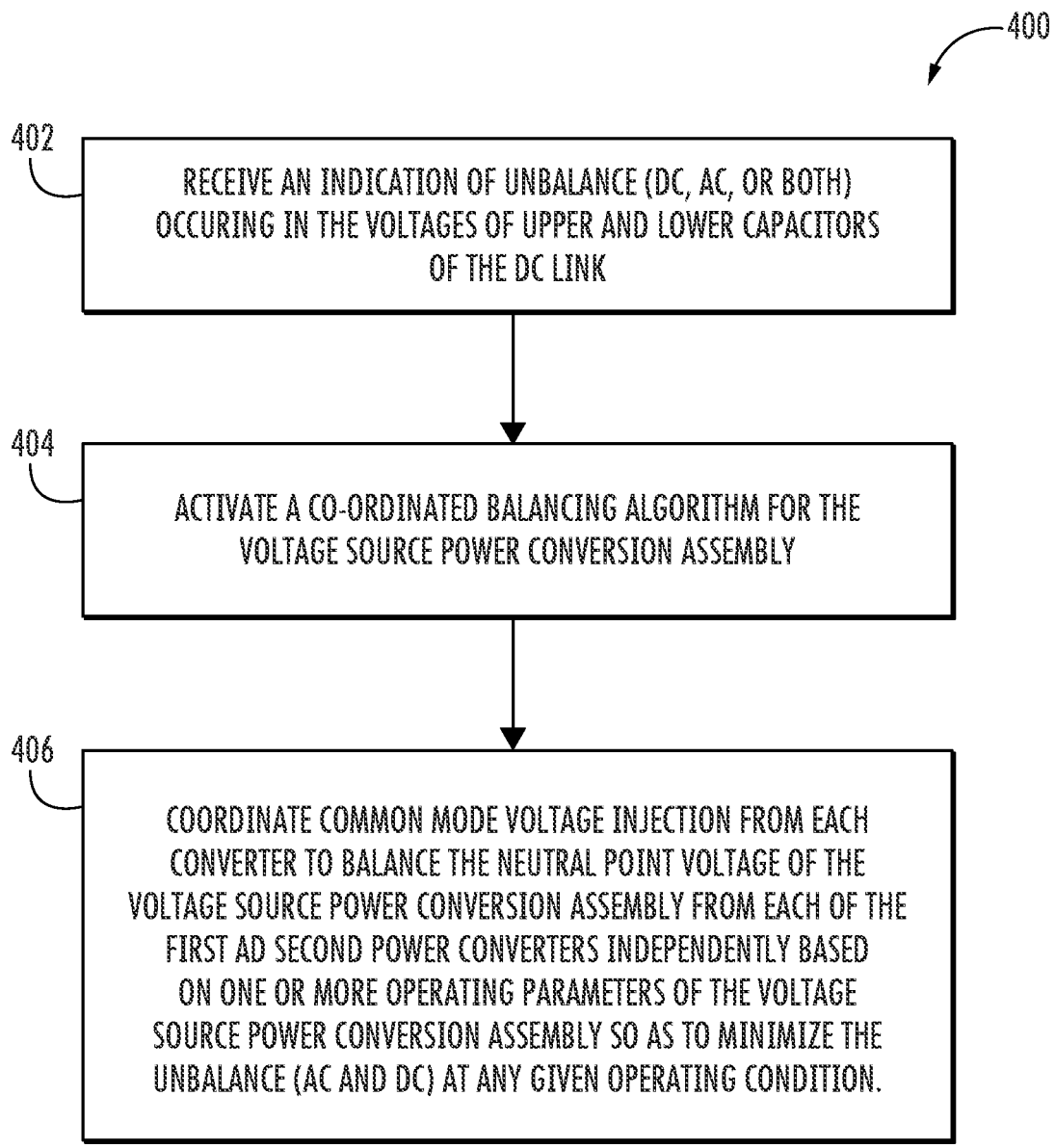
FIG. 7 illustrates a flow diagram of one embodiment of a method for controlling a voltage source power converter of a renewable energy power conversion system according to the present disclosure.

Referring now to FIGS. 6 and 7, a system 300 and method 400 for controlling a three-level back-to-back voltage source power conversion assembly of a renewable energy power conversion system are illustrated in accordance with aspects of the present disclosure. As mentioned, voltage (e.g. the DC link voltages of the upper and lower capacitors 138, 140) in a three-level back-to-back NPC power converter can have DC or AC unbalance oscillations with the triplen frequency of the converter voltage. Thus, the system 300 and method 400 of the present disclosure provide coordinated neutral point balancing for this type of converter by using adaptive controller gains 328, 330 for both the RSC 166 and the LSC 168 based on, for example, slip, modulation index, power factor, and/or active power.

In particular, as shown in FIG. 6, the system 300 may include two control paths 302 and 304, respectively, i.e. one for each of the RSC 166 and the LSC 168. Accordingly, the system 300 is configured to provide voltage balancing from both the RSC 166 and the LSC 168 that include two balancing proportional integral (PI) regulator paths 308 and 310 tuned at different bandwidths (e.g. first bandwidth and second bandwidth, respectively), i.e. one for each of the RSC 166 and the LSC 168. In certain instances, as an example, the neutral point voltage under loaded conditions can have both DC and AC unbalance ripple riding over the upper and lower DC link voltages with a frequency of three times the fundamental voltages of both LSC 168 and RSC 166. Thus, in such instances, neutral point voltage balancing enabled from the LSC 168 alone (or the RSC 166 alone) will not nullify both AC and DC unbalance as the LSC 168 alone cannot sufficiently reduce the AC unbalance generated by the RSC triplen frequency of the slip frequency. Thus, the system 300 of the present disclosure provides a mid-point balancing algorithm from both sides (i.e. the RSC 166 and the LSC 168) independently.

Referring particularly to FIG. 7, a flow diagram of an embodiment of the method 400 for controlling a voltage source power conversion assembly of a renewable energy power conversion system is illustrated in accordance with aspects of the present disclosure. In general, the method 400 is described herein as implemented using, for example, the voltage source power converter 162 of the DFIG wind turbine power system 100 described above. However, it should be appreciated that the disclosed method 400 may be implemented using any other suitable voltage source power converter now known or later developed in the art and is also not limited to wind turbine power systems. In addition, although FIG. 7 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (402), the method 400 includes receiving, via a controller, an indication of at least one of the DC unbalance or the AC unbalance occurring in voltage of the DC link 136. For example, in an embodiment, the unbalance may be DC unbalance occurring in the voltages of the upper and lower capacitors of the DC link 136 or may be an AC unbalance that occurs in a triplen frequency of a rotor slip frequency during normal operation or a triplen frequency of a line side voltage in a reactive-power-no-wind (RPNW) mode or only line side converter operation.

Thus, in response to receiving the indication, as shown at (404), the method 400 includes activating, via the controller, a balancing algorithm for the voltage source power conversion assembly 162. As shown at (406), the coordinated balance algorithm includes coordinating common mode voltage injection from each of the RSC 166 and the LSC 168 independently to balance a neutral point voltage of the voltage source power conversion assembly 162 based on one or more operating parameters of the voltage source power conversion assembly 162, thereby minimizing the DC and/or AC unbalance at any given operating condition. In an embodiment, the operating parameter(s) may include, for example, frequency of the AC unbalance, a modulation index, a power factor, a slip frequency, an active power, and/or any other operating parameter. Thus, in an embodiment, the coordinated balance algorithm may also include determining the frequency of the AC unbalance. Accordingly, in certain embodiments, the coordinated balance algorithm can be tuned dynamically by monitoring the modulation index, the rotor slip frequency, the power factor, and the active power.

For example, referring back to FIG. 6, the system 300 may receive voltages from each of the upper and lower DC link capacitors 138, 140 (e.g. VDC UPPER, VDC LOWER). Further, as shown, a selector 306 can select whether to determine the common mode voltage injection via the RSC regulator path 302, the LSC regulator path 304, or both. More specifically, as shown, each of the regulator paths 302, 304 includes a PI regulator 308, 310, a balancing algorithm 312, 314, and a dynamic voltage regulator 316, 318. Thus, each of the respective PI regulators 308, 310 can receive an error based on a comparison of voltages from each of the upper and lower DC link capacitors 138, 140 (e.g. VDC UPPER, VDC LOWER). These error values, as an example, may be indicative of the voltage of at least one of the DC unbalance or the AC unbalance or ripple or both as described herein.

More specifically, in particular embodiments and as shown, the PI regulators 308, 310 are configured to coordinate the common mode voltage injection from each of the RSC 166 and the LSC 168 independently by tuning at a first bandwidth and a different, second bandwidth, respectively and/or independently determining adaptive controller gains 328, 330 tuned dynamically by monitoring certain operating parameters, such as the modulation index, the rotor slip frequency, the power factor, and the active power for each of the RSC 166 and the LSC 168.

Accordingly, the coordinated balance algorithms 312, 314 can work together, using the operating parameters, to provide a desired common mode voltage injection at the neutral point based on, e.g. a set of rules and/or one or more look-up tables. For example, in such embodiments, the coordinated balance algorithms 312, 314 may provide the common mode voltage injection at the neutral point via at least one of the first power converter only, the second power converter only, or both the first and second power converters based on the one or more operating parameters. Thus, as shown, each PI regulator 308, 310 (i.e. one from each of the RSC 166 and the LSC 168) can then generate a common mode reference voltage signal 320, 322 for compensating the unbalance (DC, AC, or both).

As generally understood, each of the voltage/power regulators 324, 326 may include a DC link voltage regulator, a differential mode current regulator, a reactive power regulator, and a PWM modulator. As such, the DC link voltage regulator is configured to generate a d-domain reference current command signal based on an error signal, which is a difference between the reference or the desired total DC link voltage $U_{*DC,TOT}$, and the actual total DC link voltage $U_{DC,TOT}$ as obtained by a comparator, for example. In one embodiment, the DC link voltage regulator may be a proportional-integral (PI) regulator. Moreover, as shown, in an embodiment, a q-domain reference current command signal may be generated by the reactive power regulator based on a difference between a desired amount of reactive power or a reference reactive power Q* and an actual reactive power $Q_A$. As such, the differential mode current regulator receives d-q domain reference current command signals and d-q domain actual current command signals id, iq and uses those signals to generate d-q domain reference voltage command signals based on the difference between the reference and the actual current command signals. In one embodiment, the actual current command signals id, iq may be determined from measured three phase a-b-c domain load currents by transforming them into d-q domain currents. In certain embodiments, the differential mode current regulators may include two PI regulators, for example, one for d-domain currents for generating the d-domain reference voltage command signal and the other one for q-domain currents for generating the q-domain reference voltage command signal.

As further shown in FIG. 6, d-q to a-b-c domain transformation matrices may be used to transform the d-q domain reference current command signals and d-q domain reference voltage command signals into the a-b-c domain reference current command signals and the a-b-c domain reference voltage command signals, respectively, based on a phase angle θ. The phase angle θ may be generated by a phase locked loop (PLL) (not shown) based on three phase load voltages or grid voltages if the converter is connected to the power grid.

Further, as shown, the common mode reference voltage signals 320, 322 from each of the PI regulator paths can then be added to the a-b-c domain reference voltage command signals before providing the combined voltage signal to each of the PWM modulators. The resultant signal is thus used by the converter controller 174 to balance the neutral point voltage.

Figure 8:
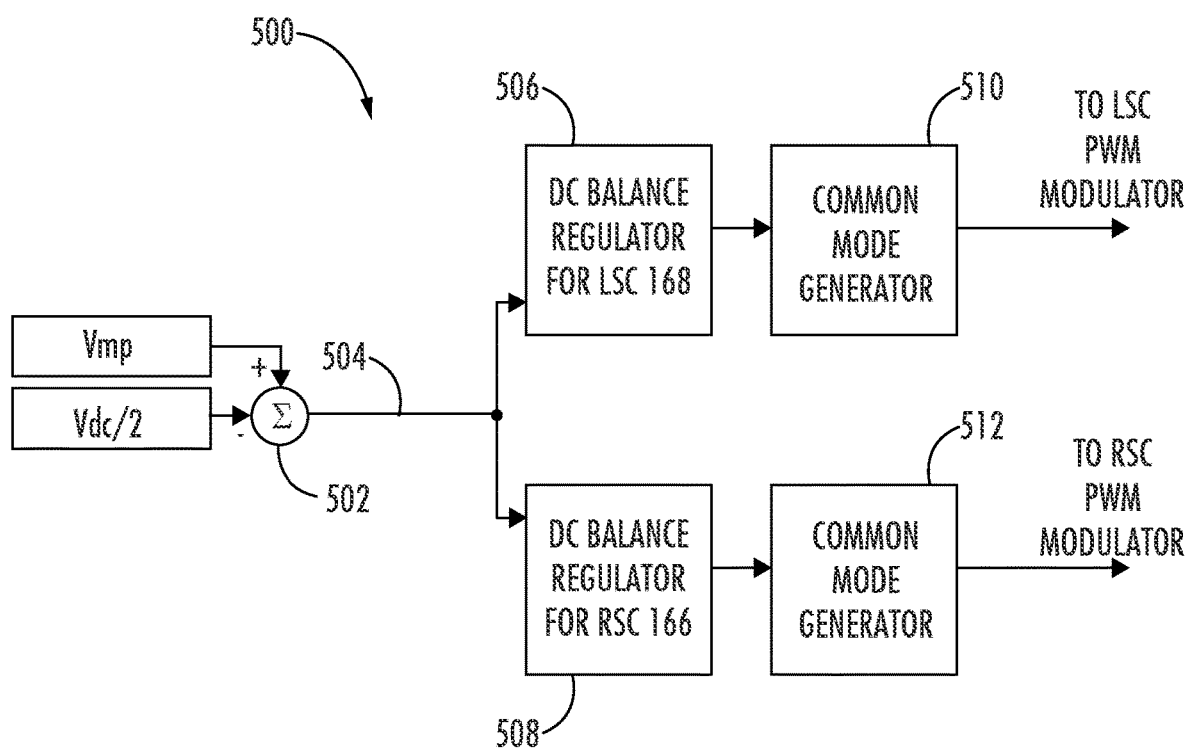
FIG. 8 illustrates a partial, schematic diagram of another embodiment of a system for controlling a three-level back-to-back voltage source power converter of a renewable energy power conversion system according to the present disclosure.

Referring now to FIG. 8, a partial, schematic diagram of another embodiment of a system 500 for controlling a three-level back-to-back voltage source power converter of a renewable energy power conversion system according to the present disclosure is illustrated. In particular, the illustrated embodiment of FIG. 8 depicts a control system 500 that utilizes a separate DC balance regulator for each of the RSC 166 and the LSC 168. Furthermore, as shown, the system 500 of FIG. 8 provides a control scheme based on the DC link midpoint balance using the PWM modulation signals to regulate the DC midpoint voltage (e.g. Vmp of FIG. 3). In such embodiments, as shown at 502, the system 500 includes determining a deviation 504 of the midpoint voltage Vmp of the DC link 136 as a function of a total voltage of the DC link 136. For example, as shown in the illustrated embodiment, the total voltage of the DC link voltage is represented as Vdc, therefore, the midpoint voltage Vmp can be calculated as a function of Vdc (i.e., e.g. Vdc/2). Therefore, in certain embodiments, the voltage deviation 504 on the midpoint voltage from Vdc/2 is proportional to the imbalance between the top and bottom capacitors 138, 140 of the DC link 136. Thus, as described herein, a proportional integral (PI) control can be used to create a control signal from the midpoint voltage deviation 504. More specifically, the midpoint voltage deviation 504 can be regulated to a desired voltage value of Vdc/2 to maintain balance among the DC capacitor voltages. In particular, as shown at 506 and 508, the midpoint deviation 504 from Vdc/2 can be used to calculate a voltage compensation needed for pulse-width modulation signals of the power conversion assembly (e.g. for respective DC balance regulators of the LSC 168 and the RSC 166, respectively) using a control loop. Thus, as shown at 510 and 512, the system 500 can coordinate common mode voltage injection from each of the LSC 168 and the RSC 166 independently at a neutral point of the voltage source power conversion assembly based on the voltage compensations from each regulator 506, 508, thereby minimizing the DC unbalance and/or the AC unbalance at any given operating condition. In other words, the voltage compensation can be made using common mode voltage injection on top of the PWM modulator signals, thereby drifting the midpoint voltage as desired.

Figure 9:
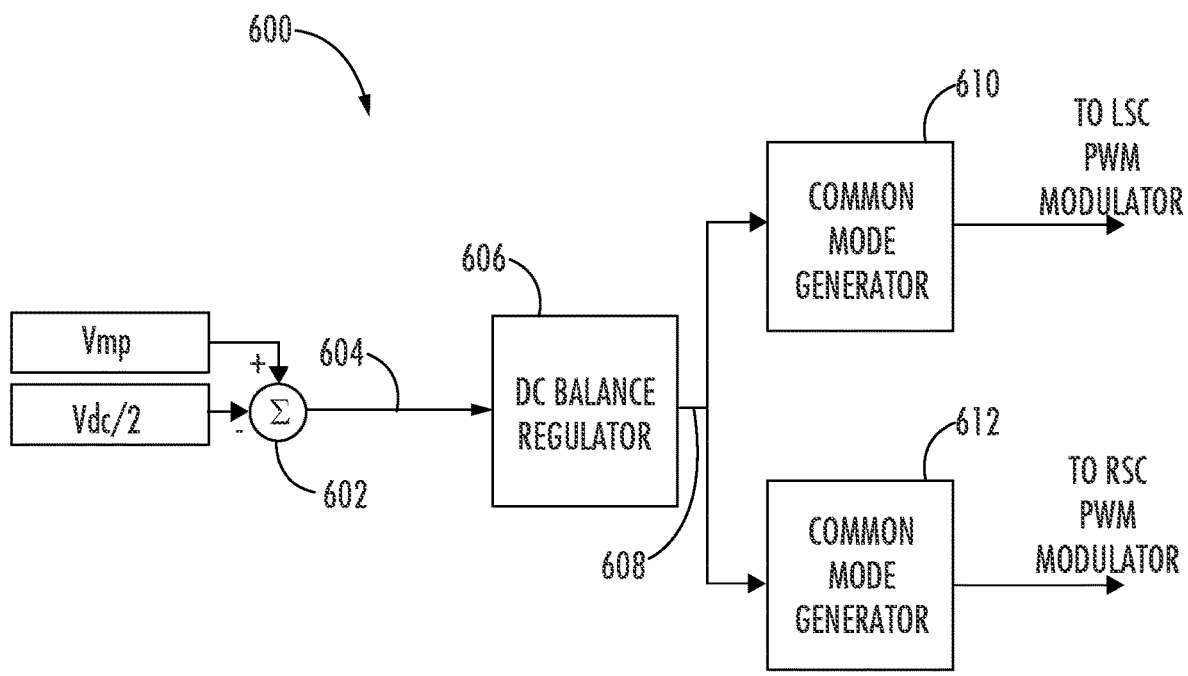
FIG. 9 illustrates a partial, schematic diagram of still another embodiment of a system for controlling a three-level back-to-back voltage source power converter of a renewable energy power conversion system according to the present disclosure.

Referring now to FIG. 9, a partial, schematic diagram of still another embodiment of a system 600 for controlling a three-level back-to-back voltage source power converter of a renewable energy power conversion system according to the present disclosure is illustrated. In particular, the illustrated embodiment of FIG. 9 depicts a control system 600 that utilizes a common DC balance regulator 606 for both the RSC 166 and the LSC 168. Furthermore, as shown, the system 600 of FIG. 9 provides a control scheme based on the DC link midpoint balance using the PWM modulation signals to regulate the DC midpoint voltage (e.g. Vmp of FIG. 3). In such embodiments, as shown at 602 and similar to FIG. 8, the system 600 includes determining a deviation 604 of the midpoint voltage Vmp of the DC link 136 as a function of a total voltage of the DC link 136. For example, as shown in the illustrated embodiment, the total voltage of the DC link voltage is represented as Vdc, therefore, the midpoint voltage Vmp can be calculated as a function of Vdc (i.e., e.g. Vdc/2). Further, as shown at 606, the system 600 may then calculate a voltage compensation needed for pulse-width modulation signals of the power conversion assembly based on the deviation 604 in the midpoint voltage. In contrast to FIG. 8, however, rather than have separate DC balance regulators, the system 600 of FIG. 9 includes a single DC balance regulator 606 that determines a singles voltage compensation 608. Thus, as shown at 610 and 612, the system 600 can coordinate common mode voltage injection from each of the LSC 168 and the RSC 166 independently at a neutral point of the voltage source power conversion assembly based on the voltage compensation 608, thereby minimizing the DC unbalance and/or the AC unbalance at any given operating condition.

It should be further understood that the various embodiments for the balancing strategies for three-level back-to-back power converters described herein, for example, as shown in FIGS. 6-9 can be combined in still further embodiments. For example, the PI regulator(s) 310 and 308 of FIG. 6 can be used to implement the midpoint voltage balancing described in FIGS. 8 and 9.

Various aspects and embodiments of the present invention are defined by the following numbered clauses:

Clause 1. A method for controlling a three-level back-to-back voltage source power conversion assembly, the voltage source power conversion assembly having a first power converter coupled to a second power converter via a direct current (DC) link; the method comprising:

receiving, via a controller, an indication of at least one of a direct current (DC) or an alternative current (AC) unbalance occurring in voltage of the DC link; and, in response to receiving the indication, activating, via the controller, a balancing algorithm for the voltage source power conversion assembly, the balancing algorithm comprising:

determining a deviation of a midpoint voltage of the DC link as a function of a total voltage of the DC link;

calculating a voltage compensation needed for pulse-width modulation signals of the power conversion assembly based on the deviation in the midpoint voltage; and coordinating common mode voltage injection from each of the first and second power converters independently at a neutral point of the voltage source power conversion assembly based on the voltage compensation, thereby minimizing the at least one of the DC unbalance or the AC unbalance at any given operating condition.

Clause 2. The method of clause 1, wherein the balancing algorithm further comprises determining a frequency of the AC unbalance.

Clause 3. The method of any of the preceding clauses, wherein coordinating the common mode voltage injection from each of the first and second power converters independently at the neutral point of the voltage source power conversion assembly based on the voltage compensation further comprises:

applying adaptive controller gains to each of the first and second power converters based on one or more operating parameters of the voltage source power conversion assembly.

Clause 4. The method of clause 3, wherein the one or more operating parameters comprise at least one of the frequency of the AC unbalance, a modulation index, a power factor, a slip frequency, or an active power.

Clause 5. The method of clause 3, wherein coordinating the common mode voltage injection from each of the first and second power converters independently at the neutral point of the voltage source power conversion assembly based on the voltage compensation further comprises:

providing first and second balancing proportional integral (PI) regulators tuned at a first bandwidth and a different, second bandwidth, respectively; and, independently determining the adaptive controller gains for each of the first and second power converters using the first and second PI regulators, respectively.

Clause 6. The method of any of the preceding clauses, wherein coordinating the common mode voltage injection from each of the first and second power converters independently at the neutral point of the voltage source power conversion assembly based on the voltage compensation further comprises:

selectively switching between the first power converter and the second power converter for providing the common mode voltage injection at the neutral point based on at least one of a set of rules or one or more look-up tables.

Clause 7. The method of clause 6, wherein selectively switching between the first power converter and the second power converter for providing the common mode voltage injection at the neutral point further comprises:

providing the common mode voltage injection at the neutral point via at least one of the first power converter only, the second power converter only, or both the first and second power converters based on the one or more operating parameters.

Clause 8. The method of any of the preceding clauses, wherein each of the first and second power converters have a plurality of switching devices arranged in a neutral point clamped (NPC) topology.

Clause 9. The method of any of the preceding clauses, wherein the three-level back-to-back voltage source power conversion assembly is part of a renewable energy power conversion system, the renewable energy power conversion system further comprising a synchronous generator or an asynchronous generator coupled to the voltage source power conversion assembly.

Clause 10. The method of clause 9, wherein the renewable energy power conversion system comprises at least one of a wind turbine power system, a solar power system, or an energy storage system.

Clause 11. The method of clause 10, wherein the renewable energy power conversion system comprises the wind turbine power system, the first power converter being a rotor-side converter, the second power converter being a line-side converter, wherein the at least one of the DC unbalance or the AC unbalance occurs in upper and lower capacitor voltages of the DC link with a triplen frequency of an asynchronous generator slip frequency or a synchronous generator fundamental frequency during normal operation or a triplen frequency of a line side voltage in a reactive-power-no-wind (RPNW) mode or only line side converter operation.

Clause 12. A three-level back-to-back voltage source power conversion assembly, comprising:
a first power converter comprising a first set of switching devices;
a second power converter coupled to the first power converter via a direct current (DC) link;
a converter controller communicatively coupled to the first and second power converters, the converter controller configured to implement a balancing algorithm for the power conversion assembly, the balancing algorithm comprising:
in response to receiving an indication of at least one of a direct current (DC) or an alternative current (AC) unbalance occurring in upper or lower capacitor voltages of the DC link, determining a deviation of a midpoint voltage of the DC link as a function of a total voltage of the DC link;
calculating a voltage compensation needed for pulse-width modulation signals of the power conversion assembly based on the deviation in the midpoint voltage; and
coordinating common mode voltage injection from each of the first and second power converters independently at a neutral point of the voltage source power conversion assembly based on the voltage compensation, thereby minimizing the at least one of the DC unbalance or the AC unbalance at any given operating condition.

Clause 13. The power conversion assembly of clause 12, wherein the balancing algorithm further comprises determining a frequency of the AC unbalance.

Clause 14. The power conversion assembly of clauses 12-13, wherein coordinating the common mode voltage injection from each of the first and second power converters independently at the neutral point of the voltage source power conversion assembly based on the voltage compensation further comprises: applying adaptive controller gains to each of the first and second power converters based on one or more operating parameters of the voltage source power conversion assembly.

Clause 15. The power conversion assembly of clause 14, wherein the one or more operating parameters comprise at least one of the frequency of the AC unbalance, a modulation index, a power factor, a slip frequency, or an active power.

Clause 16. The power conversion assembly of clause 15, wherein coordinating the common mode voltage injection from each of the first and second power converters independently at the neutral point of the voltage source power conversion assembly based on the voltage compensation further comprises: providing first and second balancing proportional integral (PI) regulators tuned at a first bandwidth and a different, second bandwidth, respectively; and, independently determining the adaptive controller gains for each of the first and second power converters using the first and second PI regulators, respectively.

Clause 17. The power conversion assembly of clauses 12-16, wherein coordinating the common mode voltage injection from each of the first and second power converters independently at the neutral point of the voltage source power conversion assembly based on the voltage compensation further comprises:
selectively switching between the first power converter and the second power converter for providing the common mode voltage injection at the neutral point based on at least one of a set of rules or one or more look-up tables.

Clause 18. The power conversion assembly of clause 17, wherein selectively switching between the first power converter and the second power converter for providing the common mode voltage injection at the neutral point further comprises:
providing the common mode voltage injection at the neutral point via at least one of the first power converter only, the second power converter only, or both the first and second power converters based on the one or more operating parameters.

Clause 19. The power conversion assembly of clauses 12-19, wherein the power conversion system comprises at least one of a wind turbine power system, a solar power system, or an energy storage system.

Clause 20. A wind turbine power system, comprising:
a generator comprising a rotor and stator;
a three-level back-to-back voltage source power conversion assembly electrically coupled to the generator, the power conversion assembly comprising:
a rotor-side converter comprising a first set of switching devices;
a line-side converter coupled to the rotor-side converter via a direct current (DC) link, the line-side converter comprising a second set of switching devices;
a converter controller communicatively coupled to the rotor-side and line-side converters, the converter controller configured to implement a balancing algorithm for the power conversion assembly, the balancing algorithm comprising:
in response to receiving an indication of at least one of a direct current (DC) or an alternative current (AC) unbalance occurring in voltage of the DC link, determining a deviation of a midpoint voltage of the DC link as a function of a total voltage of the DC link;
calculating a voltage compensation needed for pulse-width modulation signals of the power conversion assembly based on the deviation in the midpoint voltage; and
coordinating common mode voltage injection from each of the first and second power converters independently at a neutral point of the voltage source power conversion assembly based on the voltage compensation, thereby minimizing the at least one of the DC unbalance or the AC unbalance at any given operating condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a three-level back-to-back voltage source power conversion assembly, the voltage source power conversion assembly having a first power converter coupled to a second power converter via a direct current (DC) link; the method comprising:
   receiving, via a controller, an indication of at least one of a direct current (DC) or an alternative current (AC) unbalance occurring in voltage of the DC link; and,
   in response to receiving the indication, activating, via the controller, a balancing algorithm for the voltage source power conversion assembly, the balancing algorithm comprising:
      determining a deviation of a midpoint voltage of the DC link as a function of a total voltage of the DC link;
      calculating a voltage compensation needed for pulse-width modulation signals of the power conversion assembly based on the deviation in the midpoint voltage; and
      coordinating common mode voltage injection from each of the first and second power converters independently at a neutral point of the voltage source power conversion assembly based on the voltage compensation, and applying adaptive controller gains to each of the first and second power converters based on one or more operating parameters of the voltage source power conversion assembly, thereby minimizing the at least one of the DC unbalance or the AC unbalance at any given operating condition.

2. The method of claim 1, wherein the balancing algorithm further comprises determining a frequency of the AC unbalance.

3. The method of claim 1, wherein the one or more operating parameters comprise at least one of the frequency of the AC unbalance, a modulation index, a power factor, a slip frequency, or an active power.

4. The method of claim 1, wherein coordinating the common mode voltage injection from each of the first and second power converters independently at the neutral point of the voltage source power conversion assembly based on the voltage compensation further comprises:
   providing first and second balancing proportional integral (PI) regulators tuned at a first bandwidth and a different, second bandwidth, respectively; and,
   independently determining the adaptive controller gains for each of the first and second power converters using the first and second PI regulators, respectively.

5. The method of claim 1, wherein coordinating the common mode voltage injection from each of the first and second power converters independently at the neutral point of the voltage source power conversion assembly based on the voltage compensation further comprises:
   selectively switching between the first power converter and the second power converter for providing the common mode voltage injection at the neutral point based on at least one of a set of rules or one or more look-up tables.

6. The method of claim 5, wherein selectively switching between the first power converter and the second power converter for providing the common mode voltage injection at the neutral point further comprises:
   providing the common mode voltage injection at the neutral point via at least one of the first power converter only, the second power converter only, or both the first and second power converters based on the one or more operating parameters.

7. The method of claim 1, wherein each of the first and second power converters have a plurality of switching devices arranged in a neutral point clamped (NPC) topology.

8. The method of claim 1, wherein the three-level back-to-back voltage source power conversion assembly is part of a renewable energy power conversion system, the renewable energy power conversion system further comprising a synchronous generator or an asynchronous generator coupled to the voltage source power conversion assembly.

9. The method of claim 8, wherein the renewable energy power conversion system comprises at least one of a wind turbine power system, a solar power system, or an energy storage system.

10. The method of claim 9, wherein the renewable energy power conversion system comprises the wind turbine power system, the first power converter being a rotor-side converter, the second power converter being a line-side converter, wherein the at least one of the DC unbalance or the AC unbalance occurs in upper and lower capacitor voltages of the DC link with: (1) a triplen frequency of an asynchronous generator slip frequency or a synchronous generator fundamental frequency during normal operation, or (2) a triplen frequency of a line side voltage in a reactive-power-no-wind (RPNW) mode or only line side converter operation.

11. A three-level back-to-back voltage source power conversion assembly, comprising:
   a first power converter comprising a first set of switching devices;
   a second power converter coupled to the first power converter via a direct current (DC) link;
   a converter controller communicatively coupled to the first and second power converters, the converter controller configured to implement a balancing algorithm for the power conversion assembly, the balancing algorithm comprising:
      in response to receiving an indication of at least one of a direct current (DC) or an alternative current (AC) unbalance occurring in upper or lower capacitor voltages of the DC link, determining a deviation of a midpoint voltage of the DC link as a function of a total voltage of the DC link;
      calculating a voltage compensation needed for pulse-width modulation signals of the power conversion assembly based on the deviation in the midpoint voltage; and
      coordinating common mode voltage injection from each of the first and second power converters independently at a neutral point of the voltage source power conversion assembly based on the voltage compensation, and applying adaptive controller gains to each of the first and second power converters based on one or more operating parameters of the voltage source power conversion assembly, thereby minimizing the at least one of the DC unbalance or the AC unbalance at any given operating condition.

12. The power conversion assembly of claim 11, wherein the balancing algorithm further comprises determining a frequency of the AC unbalance.

13. The power conversion assembly of claim 11, wherein the one or more operating parameters comprise at least one of the frequency of the AC unbalance, a modulation index, a power factor, a slip frequency, or an active power.

14. The power conversion assembly of claim 13, wherein coordinating the common mode voltage injection from each of the first and second power converters independently at the neutral point of the voltage source power conversion assembly based on the voltage compensation further comprises:
providing first and second balancing proportional integral (PI) regulators tuned at a first bandwidth and a different, second bandwidth, respectively; and,
independently determining the adaptive controller gains for each of the first and second power converters using the first and second PI regulators, respectively.

15. The power conversion assembly of claim 11, wherein coordinating the common mode voltage injection from each of the first and second power converters independently at the neutral point of the voltage source power conversion assembly based on the voltage compensation further comprises:
selectively switching between the first power converter and the second power converter for providing the common mode voltage injection at the neutral point based on at least one of a set of rules or one or more look-up tables.

16. The power conversion assembly of claim 15, wherein selectively switching between the first power converter and the second power converter for providing the common mode voltage injection at the neutral point further comprises:
providing the common mode voltage injection at the neutral point via at least one of the first power converter only, the second power converter only, or both the first and second power converters based on the one or more operating parameters.

17. The power conversion assembly of claim 11, wherein the power conversion system comprises at least one of a wind turbine power system, a solar power system, or an energy storage system.

18. A wind turbine power system, comprising:
a generator comprising a rotor and stator;
a three-level back-to-back voltage source power conversion assembly electrically coupled to the generator, the power conversion assembly comprising:
a rotor-side converter comprising a first set of switching devices;
a line-side converter coupled to the rotor-side converter via a direct current (DC) link, the line-side converter comprising a second set of switching devices;
a converter controller communicatively coupled to the rotor-side and line-side converters, the converter controller configured to implement a balancing algorithm for the power conversion assembly, the balancing algorithm comprising:
in response to receiving an indication of at least one of a direct current (DC) or an alternative current (AC) unbalance occurring in voltage of the DC link, determining a deviation of a midpoint voltage of the DC link as a function of a total voltage of the DC link;
calculating a voltage compensation needed for pulse-width modulation signals of the power conversion assembly based on the deviation in the midpoint voltage; and
coordinating common mode voltage injection from each of the first and second power converters independently at a neutral point of the voltage source power conversion assembly based on the voltage compensation, and applying adaptive controller gains to each of the first and second power converters based on one or more operating parameters of the voltage source power conversion assembly, thereby minimizing the at least one of the DC unbalance or the AC unbalance at any given operating condition.

\* \* \* \* \*